INVENTORS
WILLIAM H. ARMISTEAD
AND STANLEY D. STOOKEY
BY Clarence R. Patty Jr.

ATTORNEY 3,208,860
PHOTOTROPIC MATERIAL AND ARTICLE
MADE THEREFROM
William H. Armistead and Stanley D. Stookey, Corning,
N.Y., assignors to Corning Glass Works, Corning, N.Y.,
a corporation of New York
Filed July 31, 1962, Ser. No. 213,634
16 Claims. (Cl. 106—54)

This application is a continuation-in-part of our pending applications Serial No. 79,614, filed December 30, 1960, and Serial No. 153,272, filed November 24, 1961, both now abandoned.

This invention relates to novel articles which comprise inorganic silicate glasses which possess the characteristic that their optical transmittance varies reversibly with the intensity of actinic radiation incident thereon.

While glass has been utilized for a considerable period of time in a wide variety of applications wherein the inherent transparency or translucency of the glass can be advantageously employed, considerable effort has been expended to develop means for decreasing the glare and/or heat transmission characteristics of glasses utilized for windows, walls, ophthalmic lenses, and the like. Although such efforts have resulted in a wide variety of useful products, such as tinted or colored glasses and opal glasses, they are each characterized by the fact that a compromise must be made in the transmission of the glass as there has heretofore been no means by which windows of glass could have their transmittance varied except by auxiliary means such as shades or venetian blinds.

Organic plastics have been developed which can be utilized alone or as laminate for glass sheets to produce articles having these desired properties, but such materials lose their desirable characteristics within a relatively short time.

Furthermore, photosensitive glasses have been developed which can be darkened by exposure to ultraviolet radiation followed by heat treatment thereof. However, as can be readily appreciated, such glasses would not be suitable for any of the above applications because of the required heat treatment after exposure to actinic radiation and also because the darkening is not reversible.

The principal object of this invention is to provide an article which has an optical density which varies reversibly with the amount of actinic radiation incident thereon; that is, a phototropic article.

Another object of this invention is to provide a transparent phototropic article.

Figure 1:
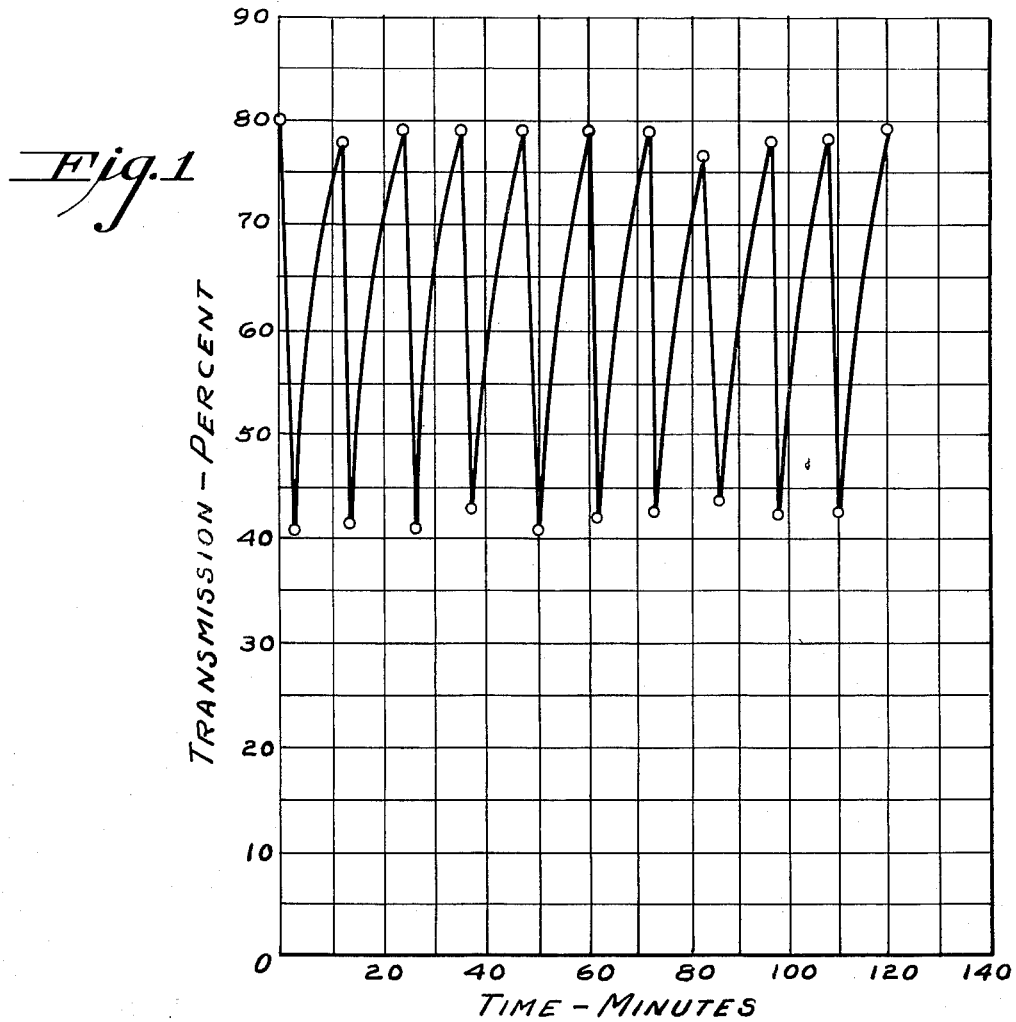
Figure 2:
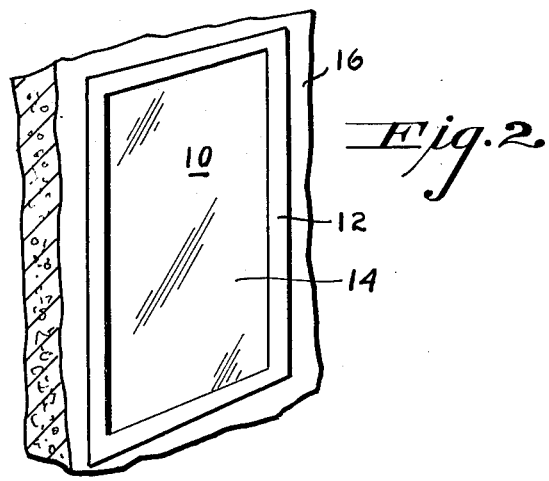

In the drawing, FIG. 1 illustrates the reversible change in the transmission of visible radiation of an article of this invention upon alternate exposure and non-exposure to actinic radiation, and FIG. 2 is a perspective view illustrating one embodiment of an article according to this invention.

We have now found that the principal object of this invention can be obtained in an article comprising an inorganic silicate glass having in at least a portion thereof inorganic crystals which become darker in color upon exposure to actinic radiation of wave lengths between 0.3–0.5 micron, the concentration of said crystals in said portion being at least 0.005% by volume and said crystals being completely encased in said glass. Furthermore, an article comprising an inorganic silicate glass of such structure containing said crystals in a concentration in said portion thereof up to 0.1% by volume, said crystals being not more than 0.1 micron, preferably 0.004–0.02 micron, in diameter, and the remainder of said portion being amorphous, results in an article which is transparent and phototropic in said portion thereof.

Glasses which possess the described structure have the desired characteristic that their transmission of visible radiation is decreased when exposed to actinic radiations of the ultraviolet and blue portions of the spectrum, that is, radiations having wave lengths of from about 0.3 to 0.5 micron, but regain their original transmissivity to visible radiation when the actinic radiation is removed therefrom. While the reason for this effect is not known, it apparently is caused by a reaction between the actinic radiation and the crystals dispersed in the glassy matrix which changes the absorptive qualities of the crystals upon visible radiations. However, as these crystals are dispersed in an amorphous, inorganic silicate matrix, the removal of the actinic radiation permits the crystals to resume their original state, as such glassy matrix is impermeable to the reaction products formed upon such exposure and they, therefore, cannot diffuse away.

We have found that it is necessary that the crystals be present in the phototropic portion of the glass body in a concentration of at least 0.005% by volume to produce a discernible effect on visible radiation. While neither the maximum concentration of such crystals nor the size thereof appear to be critical for such articles to exhibit phototropic characteristics, provided that the crystals are completely encased in the silicate glass to prevent permanent change therein upon exposure to actinic radiation, we have found that a transparent phototropic article results when the concentration of such crystals does not exceed 0.1% by volume, the size of the crystals does not exceed 0.1 micron in diameter, and there are no other crystalline phases present in the glassy matrix, that is, the remainder of the glass structure is essentially amorphous. Thus these glasses contain a sufficient amount of such crystals to noticeably effect the absorption of visible radiation but have negligible scattering effect on such radiation.

While it is generally possible to determine the concentration of the crystals which exhibit the desired sensitivity in opal or translucent glass structures because they are of such size and concentration as to be usually observable by optical microscopy, the content of crystals and size thereof in transparent structures must be determined by utilizing an electron microscope. For this purpose we have utilized a type EMU 3–B electron microscope, having a resolving power down to 20 Angstroms (.002 micron). As an example of such phototropic article, we have found that a sheet of transparent silicate glass which contains 0.01% by volume, as determined by petrographical analysis of an electron micrograph prepared on such apparatus, of silver chloride crystals, said crystals being predominately 50–60 Angstroms in diameter, dispersed in the amorphous matrix exhibits the desired phototropic characteristics.

In addition to silver chloride crystals, other suitable crystals comprise silver bromide, and silver iodide.

The preferred method of making the phototropic articles of this invention comprises incorporating the constituents of the desired crystalline phase in the glass and thereafter precipitating such crystals in situ in the glassy matrix. Such method is hereinafter described with respect to such articles in which the radiation sensitive crystals comprise a silver halide selected from the group consisting of silver chloride, silver bromide, silver iodide and mixtures thereof for purposes of illustration and not by way of limitation.

Such articles may be made from glasses melted from batches in the conventional manner and formed to the desired shape and cooled according to the usual procedures employed in glass working, the constituents of the desired silver halide being added to the batch along with the constituents of the glassy matrix. In order to produce the minimum amount of required crystallinity within the ultimate glass structure, it is necessary that a sufficient concentration of silver and at least one of the halogens, chlorine, bromine and/or iodine be produced in the glass to permit crystallization therefrom of the phototropic crystals. As each of the three silver halides apparently possess a different solubility and/or tendency for supersaturation in the glass matrix, the minimum silver and halogen concentration which will produce a phototropic body depends upon the particular halogen or halide anion present within the glass. Thus, in a glass which contains the constituents of silver chloride as the only phototropic phase, the silver must be present in an amount of 0.2% by weight as determined by conventional chemical analysis thereof, such as gravimetric or spectrophotometric methods, and the glass must also contain on an analyzed basis, at least 0.2% by weight of chlorine. However, a glass which contains 0.1% of bromine, either alone or in combination with chlorine, need only contain 0.05% by weight of chemically analyzed silver. Furthermore, as silver iodide exhibits the least solubility and/or tendency towards supersaturation in the glass of these three desired silver halides, only 0.03% by weight of chemically analyzed silver is necessary to permit production of a phototropic article provided the iodine concentration is at least 0.08%. Thus, since it is only essential that glass contain one of the three halogens in at least the minimum effective amount specified, suitable glasses can be made which contain a plurality of halogens wherein the concentration of the second and/or third halogens is present in a greater or lesser amount than its respective effective amount. However, in determining the minimum amount of silver which will be operative for a particular halogen concentration, only the one or more halogens which are present in an effective amount are utilized to ascertain the silver level required. The various combinations possible with respect to halogen-content of the glass and the corresponding minimum silver concentration necessary under such circumstances are set forth in the following table:

| | Halogen Concentration | Minimum Silver Concentration, Percent |
|---|---|---|
| A | Cl at least 0.20%<br>Br less than 0.10%<br>I less than 0.08% | 0.20 |
| B | Br at least 0.10%<br>Cl less than 0.20%<br>I less than 0.08% | 0.05 |
| C | Br at least 0.10%<br>Cl at least 0.20%<br>I less than 0.08% | 0.05 |
| D | I at least 0.08%<br>Cl less than 0.20%<br>Br less than 0.10% | 0.03 |
| E | I at least 0.08%<br>Cl at least 0.20%<br>Br less than 0.10% | 0.03 |
| F | I at least 0.08%<br>Cl less than 0.20%<br>Br at least 0.10% | 0.03 |
| G | I at least 0.08%<br>Cl at least 0.20%<br>Br at least 0.10% | 0.03 |

The above table, therefore, illustrates that the minimum silver concentration is determined by the halogen or halogens which are present in an effective amount (the effective concentration for each of the three halogens being independent of the presence or absence of either of the other suitable halogens) and, in the event that a plurality of the three halogens are present in an effective amount, iodine is primarily controlling of the minimum silver concentration, while bromine is controlling when less than an effective amount of iodine is present. Furthermore, the above table illustrates that the presence of a second and/or third halogen in the glass in less than an effective or critical amount of the particular halogen has no more effect on the effective concentration of the primary halogen or the corresponding minimum silver concentration than if the glass contained only the one halogen in the specified effective concentration. To summarize, a potentially phototropic glass is produced when it comprises on a weight percent basis as determined by chemical analysis at least one halogen in the indicated minimum effective proportion of 0.2% chlorine, 0.1% bromine, and 0.08% iodine, and a minimum of silver in the indicated proportion of 0.2% in a glass wherein the effective halogen consists of chlorine, 0.05% in a glass containing at least 0.1 bromine but containing less than 0.08% iodine, and 0.03% in a glass which contains at least 0.08% iodine. While there does not appear to be any critical maximum amount of silver and/or the enumerated halogens which can be utilized, glasses which contain an analyzed silver concentration in excess of 0.7% result in a phototropic structure which is translucent or opalized and glasses which contain an analyzed silver concentration in excess of 1.5% do not appear to produce any advantageous increase in the phototropic characteristics of the ultimate glass structure. Therefore, needless expense and waste of silver results in utilizing glasses containing more than 1.5% of silver. Likewise, the total amount of the three enumerated halogens should preferably be limited to about 2.0% by weight for practical reasons. Furthermore, in order to produce a transparent phototropic glass structure containing such silver halide crystals, the analytically determined concentration of the silver in the glass must not exceed 0.7% by weight and the analyzed total concentration of the three aforementioned halogens must not exceed 0.6% by weight. However, as is well known, halides are prone to volatilize during the melting process and such losses can amount to 30–60% of the amount added to the batch depending upon the melting temperature and time, the type of melting unit employed, and the concentration of the halide in the melt. Likewise, silver can also be lost from the batch during melting, probably due to volatilization of silver halide, but the amount so lost is only on the order of 15–30% of that added. However, for any particular set of circumstances, one can readily adjust the batch composition to compensate for such loss, and the wide latitude in the permissible amounts of such essential ingredients makes it possible to utilize rough approximations for this purpose and still produce the desired article.

Although it is necessary that the desired silver halide crystals be encased within a glassy matrix to produce an article having the desired characteristics, such crystals can be obtained by including the constituents thereof in the glass batch as explained above or by introducing silver ions into an article of a glass containing the anions of such halides, and also alkali metal oxides, but being free of silver. This is accomplished by applying to the surface of such glass articles a finely divided material containing silver or a compound of silver and heating the glass article and the material while in contact in accordance with conventional silver-staining procedures, whereby an exchange of silver for alkali metal ions in at least the surface of the glass is effected and such silver ions can thereupon react with the appropriate halide anions to form the desired silver halide crystals therein.

As has been pointed out above, the phototropicity of the preferred articles of this invention is caused by the silver halide crystals dispersed in the glassy matrix. These particles can be precipitated upon cooling the glass from the melt, but it is possible to cool the glass rapidly enough that no crystallites of the desired silver halide, or at least an insufficient number thereof, are precipitated to produce a noticeable phototropic effect in the glass. This result can be remedied by exposing the article to a temperature above the strain point of the glass for a time sufficient to allow the silver cations and the halide anions to re-arrange themselves within the glass structure to a condition of closer proximity whereby they will form a second amorphous phase consisting of submicroscopic droplets comprising molten silver halide in an amount at least equal to 0.005% by volume of the glass and the silver halide will crystallize upon cooling below the melting point of the respective silver halide. Preferably, the article should not be exposed to a temperature above its softening point to cause this additional precipitation of the desired silver halide, as such treatment would cause excessive deformation of the formed glass article unless it is supported by the auxiliary means during the heat treatment.

As the purpose of the heat-treatment is to allow the rearrangement of the silver cations and the halide anions and thereby form a separate phase within the glass matrix, it can be readily appreciated that this rearrangement will proceed more rapidly the higher the temperature, primarily because the viscosity of the glass matrix decreases with increase in temperature, and the resistance to the movement accomplishing the rearrangement will be thereby decreased. As a general rule, a satisfactory heat-treatment comprises exposure of the glass article to the strain point temperature for a time of about 16 hours or to the softening temperature for about 15 minutes. In view of the fact that there are other possible reactions which can occur during the heat treatment, such as agglomeration and growth of the silver halide droplets and/or precipitation of other crystalline phases, it is necessary that the heat treatment at the higher portion of the operable range be of limited duration to preclude the occurrence of these undesirable secondary reactions.

The appropriate heat treatment can be readily determined by placing about five samples of a particular composition in the form of ¼" cane of a sufficient length to extend through a zoned furnace maintained at a uniform temperature gradient between the strain and softening point of the composition, and heating the samples within such furnace and withdrawing the samples after varying time, for example 1, 2, 4, 8, and 16 hours. Examination of the phototropic characteristics of the glass will thereby permit the selection of a suitable heat treatment to be applied to such composition to produce the most desirable phototropic properties.

Examples of glasses having the potential of being made phototropic by suitable heat treatment thereof are set forth in Table I as chemically analyzed on a weight percent basis.

*Table I*

|  | 1 | 2 | 3 | 4 |
|---|---|---|---|---|
| $SiO_2$ | 60.1 | 60.3 | 59.9 | 59.8 |
| $Na_2O$ | 10.0 | 10.0 | 10.0 | 10.0 |
| $Al_2O_3$ | 9.5 | 9.5 | 9.5 | 9.5 |
| $B_2O_3$ | 20.0 | 20.0 | 20.0 | 20.0 |
| Ag | .40 | .24 | .58 | .70 |
| Br | .17 | .26 |  | .09 |
| Cl | .1 |  | .31 | .16 |
| F | .84 | .80 | .94 | .85 |
| CuO | 0.017 |  |  |  |

In accordance with conventional practice, the halogen content of the above glasses, including fluorine, is expressed as percent by weight in excess of the total glass composition in which each of the constituents listed other than the halogens total approximately 100%. Likewise, while it is known that at least a substantial proportion, if not all, of the silver is present in the glass as ions thereof probably having bonds with oxygen and/or the halogens, and not as metallic silver, it is expressed in the above table as silver, as this is one of the conventional methods utilized in the art.

In addition to the above described structure in which crystals of silver halide in the specified concentration are dispersed within a glassy matrix, we believe that the phototropic characteristics are improved by the inclusion in the silver halide crystals of a small amount of metallic or atomic silver. While it has not been possible to positively establish the presence of silver in such form by any presently known techniques or apparatus, the fact that control of either the silver to halide ratio, or the level of so-called low-temperature reducing agents in the surrounding glassy matrix, within such limits as would tend to reduce a minor proportion of the silver content of the object to metallic silver improves the desired properties in structures containing amounts of silver halide crystals within the lower range of that described, that is, when the amount of silver halide crystals is between 0.005–0.1% by volume, strongly suggests that metallic silver is the cause of this improvement in phototropicity.

More specifically, we have found that when the total amount by weight of the halogens, chlorine, bromine, and iodine, as determined by chemical analysis is limited to less than the weight percent of silver, computed as free silver, but containing an effective amount of at least one of said halogens, the phototropic properties are improved, probably due to the fact that the equilibrium dissociation of the silver halide into metallic silver and nascent halogen is sufficient to produce a catalytic amount of atomic silver within the crystals of silver halide. A similar result is achieved even when the total amount of an enumerated halogens is substantially greater than the amount of silver, provided that a low-temperature reducing agent in the indicated proportion selected from the group comprising 0.002–0.10% tin oxide, computed as $SnO_2$; 0.002–0.02% iron oxide, computed as FeO; 0.01–0.1% copper oxide, computed as CuO; 0.04–0.4% arsenic oxide, computed as $As_2O_3$; and 0.1–1.0% antimony oxide, computed as $Sb_2O_3$, is included in the glass.

The polyvalent cations of these oxides are known to have the ability to act as reducing agents in glasses at temperatures within the annealing ranges of conventional glasses. Although during the early part of the melting process these oxides may be oxidized to their highest state of oxidation, at least a part of such oxides are believed to be reduced to a low oxidation state at the melting temperature. It is this reduced form of these oxides which is believed to reduce a very small but significant proportion of the silver halide to metallic silver. While each of the enumerated reducing agents is effective within the stated proportions, less than the stated amounts do not appear to produce the desired improvement in phototropic characteristics whereas greater amounts cause such a large proportion of the silver halide to be reduced to the metallic condition that the ability of the silver halide crystals to impart phototropicity to the structure is thereby impaired, and/or the glass becomes black and opaque. Furthermore, copper oxide is particularly desirable because it is effective in small amounts which do not undesirably discolor the glass and, in fact, compensates for the yellowish coloration imparted to the glass by the silver content thereof.

We have furthermore found that a particularly desirable transparent phototropic glass can be readily and preferably obtained in a base glass composition comprising by weight 40–76% $SiO_2$, 4–26% $Al_2O_3$, 4–26% $B_2O_3$, and at least one alkali-metal oxide in the indicated proportion selected from the group consisting of 2–8% $Li_2O$, 4–15% $Na_2O$, 6–20% $K_2O$, 8–25% $Rb_2O$, and 10–30% $Cs_2O$, the total of these recited base glass constituents and the constituents of the silver halide crystals comprising at least 85% of the total glass composition, by melting the glass batch therefor in a non-reducing atmosphere at a temperature of from 1400°–1500° C. for a time of from 4–8 hours to produce a melt which can be formed to articles of the desired shape by conventional glass-working techniques such as drawing, pressing, rolling, blowing, and the like, and the desired crystallization of the silver halide crystals is obtained during the forming and cooling process or by a subsequent heat treatment.

For best results in the above glass system the silicia, boric oxide, alumina, and alkali-metal oxides of the above composition are preferably maintained within the prescribed ranges because a glass containing less than the indicated amount of silica tends to precipitate undesirable crystalline phases either simultaneously with or before the desired silver halide thus undesirably increasing opacity; whereas a glass containing more than 76% $SiO_2$ or less than the indicated amount of alkali metal oxide is difficult to melt at conventional melting temperatures, a glass containing more than 26% $B_2O_3$ or more than the indicated amount of alkali metal oxide is subject to undesirable chemical attack or weathering. Inclusion of at least 4% $B_2O_3$ insures precipitation of the silver halide crystals within a practical period of time of exposure to temperatures between the strain and softening points of the glass. Maintaining alumina within the prescribed range insures that the glass will not form undesirable glassy or crystalline phases either simultaneously with or in preference to the desired halide.

In addition to the recited constituents of this preferred base glass composition, other constituents such as fluorine, the bivalent metal oxides, and $P_2O_5$ may also be included in the composition. For example, fluorine may be added to the glass by including fluorides in the batch materials to make the glass more easily meltable, even though it is not possible to precipitate silver fluoride crystals within a glassy phase. However, the amount of fluorine should not be so large as to cause the precipitation of other crystalline fluorides within the glass, particularly when bivalent metal oxides such as calcium oxide and barium oxide are included within the glass composition.

While the bivalent metal oxides such as MgO, CaO, BaO, SrO, ZnO, and PbO have little effect on the phototropic characteristics of the preferred glasses, their presence should be limited to prevent the formation of other crystalline phases which would undesirably increase opacity. For this reason, no more than about 4%, MgO, 6% CaO, 7% SrO, 8% BaO, 8% ZnO, or 10% PbO should be present individually, and the total amount of these constituents should not exceed 15% by weight of the total glass composition.

Examples of suitable glasses of the preferred type having the capability of being converted by heat-treatment to the requisite structure to exhibit phototropic characteristics are set forth in Table II in weight percent as computed from the batch, the silver being expressed as metallic silver, and the halides being expressed as percent in excess of the total glass composition in which each of the constituents other than the halogens total 100%.

*Table II*

| | 5 | 6 | 7 | 8 | 9 | 10 | 11 |
|---|---|---|---|---|---|---|---|
| $SiO_2$ | 62.8 | 62.8 | 62.8 | 62.7 | 60.4 | 60.7 | 61.5 |
| $Al_2O_3$ | 7.0 | 10.0 | 10.0 | 6.0 | 9.5 | 9.6 | 10.7 |
| $B_2O_3$ | 22.9 | 20.9 | 15.9 | 19.9 | 19.0 | 19.2 | 16.6 |
| $Na_2O$ | 6.9 | 5.9 | 10.9 | 10.9 | 10.0 | 10.1 | 10.7 |
| Ag | .38 | .38 | .38 | .38 | 1.08 | .36 | .44 |
| CuO | .016 | .016 | .016 | .016 | 0.02 | 0.015 | 0.016 |
| F | 2.5 | 2.5 | 2.5 | 2.5 | 2.5 | 2.5 | 2.5 |
| Cl | 1.7 | 1.6 | 1.7 | 1.7 | 1.9 | 1.7 | 0.8 |
| Appearance | Clear | (¹) | Clear | Clear | (²) | Clear | Clear |

| | 12 | 13 | 14 | 15 | 16 | 17 | 18 |
|---|---|---|---|---|---|---|---|
| $SiO_2$ | 61.5 | 68.7 | 62.8 | 62.8 | 62.7 | 60.8 | 60.7 |
| $Al_2O_3$ | 10.7 | 10.0 | 4.0 | 5.0 | 9.9 | 9.6 | 9.6 |
| $B_2O_3$ | 16.6 | 10.9 | 19.9 | 24.9 | 19.9 | 19.3 | 19.3 |
| $Na_2O$ | 10.7 | 10.0 | 12.9 | 6.9 | 7.0 | 10.1 | 10.1 |
| Ag | .44 | .38 | .38 | .38 | .45 | .22 | .29 |
| CuO | 0.016 | .016 | .016 | .016 | .016 | .01 | .002 |
| F | 2.5 | 2.5 | 2.5 | 8.5 | 2.5 | 2.5 | 2.5 |
| Cl | | 1.7 | 1.7 | 1.7 | 1.7 | 0.3 | 1.7 |
| Br | 1.2 | | | | | | |
| Appearance | (¹) | Clear | Clear | Clear | Clear | Clear | Clear |

| | 19 | 20 | 21 | 22 | 23 | 24 | 25 |
|---|---|---|---|---|---|---|---|
| $SiO_2$ | 74.5 | 62.7 | 60.5 | 60.3 | 60.3 | 60.3 | 60.2 |
| $Al_2O_3$ | 10.0 | 9.9 | 9.6 | 9.5 | 9.5 | 9.5 | 9.5 |
| $B_2O_3$ | 4.0 | 19.8 | 19.1 | 19.1 | 19.0 | 19.1 | 19.1 |
| $Na_2O$ | 10.9 | 6.9 | 10.0 | 10.0 | 10.0 | 10.0 | 10.0 |
| Ag | .38 | .60 | .72 | 1.08 | 1.08 | 1.08 | 1.22 |
| CuO | .016 | .063 | .05 | | .08 | 0.001 | |
| $Sb_2O_3$ | .10 | | | | | | |
| F | 2.5 | 2.5 | 2.5 | 2.5 | 2.5 | 2.5 | 2.5 |
| Cl | 0.3 | 0.8 | 1.8 | 0.7 | 1.9 | 2.4 | 2.0 |
| Appearance | Clear | (³) | (³) | (⁴) | (³) | (²) | (²) |

| | 26 | 27 | 28 | 29 | 30 | 31 | 32 |
|---|---|---|---|---|---|---|---|
| $SiO_2$ | 60.6 | 42.9 | 59.1 | 59.1 | 59.2 | 59.2 | 59.3 |
| $Al_2O_3$ | 9.6 | 25.7 | 9.2 | 13.3 | 9.4 | 9.4 | 9.4 |
| $B_2O_3$ | 19.1 | 20.0 | 20.1 | 16.0 | 20.0 | 16.0 | 20.0 |
| $Na_2O$ | 10.0 | 10.9 | 11.1 | 11.1 | 10.9 | 14.9 | 10.9 |
| Ag | 0.72 | 0.61 | 0.50 | 0.50 | 0.50 | 0.50 | 0.41 |
| CuO | 0.008 | 0.016 | .008 | .007 | 0.016 | 0.015 | 0.016 |
| F | 2.5 | 1.45 | 1.4 | 1.45 | 1.45 | 1.45 | 1.45 |
| Cl | 1.8 | 0.4 | 0.4 | 0.4 | 0.39 | | |
| Br | | | | | | 0.6 | 0.6 |
| Appearance | (⁴) | Clear | Clear | Clear | Clear | Clear | Clear |

| | 33 | 34 | 35 | 36 | 37 |
|---|---|---|---|---|---|
| $SiO_2$ | 59.2 | 58.5 | 59.1 | 58.1 | 59.1 |
| $Al_2O_3$ | 9.4 | 9.2 | 9.3 | 9.2 | 9.2 |
| $B_2O_3$ | 20.0 | 19.9 | 17.0 | 20.6 | 17.0 |
| $Na_2O$ | 10.9 | 11.0 | 8.0 | 11.2 | 8.0 |
| CaO | | 1.0 | | | |
| ZnO | | | 6.1 | | |
| BaO | | | | | 6.2 |
| Ag | 0.50 | 0.35 | 0.50 | 0.86 | 0.50 |
| CuO | .016 | 0.15 | 0.015 | 0.02 | .015 |
| F | | 1.45 | 1.45 | 1.69 | 1.45 |
| Cl | 0.39 | 0.4 | 0.4 | 0.49 | 0.4 |
| Appearance | Clear | Clear | Clear | Clear | Clear |

| | 38 | 39 | 40 | 41 |
|---|---|---|---|---|
| $SiO_2$ | 57.1 | 36.2 | 59.8 | 59.2 |
| $Al_2O_3$ | 9.7 | 9.1 | 9.9 | 9.4 |
| $Na_2O$ | | | 9.9 | 10.2 |
| $K_2O$ | 11.3 | | | 0.6 |
| $Cs_2O$ | | 27.1 | | |
| $B_2O_3$ | 21.4 | 27.1 | 19.9 | 20.1 |
| CuO | .016 | .016 | .016 | |
| Ag | .50 | .50 | .50 | .49 |
| Cl | 1.0 | .87 | | .49 |
| F | 1.45 | 1.37 | 1.40 | 1.45 |
| I | | | .59 | |

| | 42 | 43 | 44 | 45 |
|---|---|---|---|---|
| $SiO_2$ | 58.8 | 58.9 | 58.9 | 58.9 |
| $Al_2O_3$ | 9.3 | 9.3 | 9.3 | 9.3 |
| $Na_2O$ | 10.8 | 10.8 | 10.8 | 10.8 |
| $K_2O$ | 1.0 | 1.0 | 1.0 | 1.0 |
| $B_2O_3$ | 18.9 | 18.9 | 18.9 | 18.9 |
| CuO | 0.016 | 0.016 | 0.016 | 0.016 |
| Ag | 0.2 | 0.1 | 0.08 | 0.04 |
| Cl | 0.4 | 0.4 | 0.8 | 0.8 |
| F | 1.45 | 1.45 | 1.45 | 1.45 |
| I | 0.08 | 0.2 | 00.32 | 0.5 |
| PbO | 1.0 | 1.0 | 1.0 | 1.0 |
| Appearance | Clear | Clear | Clear | Clear |

| | 46 | 47 | 48 |
|---|---|---|---|
| $SiO_2$ | 58.3 | 59.2 | 59.4 |
| $Al_2O_3$ | 9.2 | 9.4 | 9.4 |
| $Na_2O$ | 10.7 | 10.9 | 11.0 |
| $K_2O$ | 1.0 | 1.0 | 1.0 |
| $B_2O_3$ | 18.7 | 19.1 | 19.1 |
| Ag | 0.075 | 0.14 | 0.06 |
| CuO | 0.016 | 0.016 | 0.016 |
| Cl | | 0.6 | |
| F | 1.45 | 1.45 | 1.45 |
| Br | 0.3 | 0.6 | 0.3 |
| PbO | 2.0 | 0.2 | |
| Appearance | Clear | Clear | Clear |

¹ Translucent White.
² White Opal.
³ Yellow Opal.
⁴ Pink Opal.

The glass compositions set forth in Table II can be prepared by melting batches prepared in accordance with standard procedures for compounding glass batches, bearing in mind that provision must be made for volatilization of a substantial portion (30–50%) of the halide constituents and possibly up to 30% of the silver. Examples of suitable batches which have been utilized to produce in one-pound melts in a crucible maintained at 1450° C. for 6 hours the corresponding glasses of Table II are set forth in Table III.

*Table III*

|  | 1 | 7 | 24 | 26 | 30 | 31 | 33 |
|---|---|---|---|---|---|---|---|
| Sand | 285 | 276 | 562 | 548 | 289 | 275 | 275 |
| Alumina Hydrate | 49 | 75 | 150 | 150 | 75 | 75 | 75 |
| Boric Acid | 135 | 91 |  |  |  | 33 | 33 |
| Borax | 92 | 92 | 586 | 586 | 293 | 200 | 200 |
| NaNO₃ | 42 | 40 | 23 | 24 | 12 | 12 | 12 |
| NaCl | 13 |  | 7 | 7 | 3.5 | 4 | 4 |
| Na₂SiF₆ | 25 | 25 | 26 |  | 13 | 13 | 13 |
| AgCl Mix ᵃ | 25 |  |  |  |  |  |  |
| CuO | .08 |  | .08 | .08 |  |  |  |
| Na₂CO₃ |  | 25 |  |  |  |  |  |
| NaBr |  | 5 |  |  |  |  |  |
| AgNO₃ Mix ᵇ |  | 35 |  |  |  |  |  |
| AgNO₃ Mix ᶜ |  |  | 70 | 70 | 25 | 35 | 35 |
| K₂SiF₆ |  |  |  | 26 |  |  |  |
| CuO Mix ᵈ |  |  |  | 16 | 8 | 8 | 8 |
| CaCO₃ |  |  |  |  | 9 |  |  |
| BaCO₃ |  |  |  |  |  |  | 38.4 |
| ZnO |  |  |  |  | 30 |  |  |

ᵃ AgCl Mix—10% AgCl, 90% Sand by weight.
ᵇ AgNO₃ Mix—10% AgNO₃, 90% Sand by weight.
ᶜ AgNO₃ Mix—12% AgNO₃, 88% Sand by weight.
ᵈ CuO Mix—1% CuO, 99% Sand by weight.

To illustrate the extent of the silver and halide volatilization, chemical analyses were performed on some of the glasses melted from the above batches. The analyzed compositions are set forth in Table IV.

*Table IV*

|  | 28 | 30 |
|---|---|---|
| $SiO_2$ | 60.7 | 59.6 |
| $Al_2O_3$ | 9.5 | 9.5 |
| $B_2O_3$ | 19.5 | 19.6 |
| $Na_2O$ | 10.0 | 10.2 |
| $K_2O$ |  | 1.0 |
| Ag | .33 | .38 |
| CuO | .0089 | .011 |
| F | .86 | .87 |
| Cl | .26 | .27 |

As can be seen from a comparison of the analyzed compositions with those merely calculated from the batch, the only significant variations are in the amounts of silver and halides.

The compositions set forth in Table II illustrate the wide variety of constituents and amounts thereof which form suitable glass matrices for the silver halide crystallites. Furthermore, such compositions also illustrate that glasses which contain on a chemically analyzed basis an amount of silver, computed as free silver, between 0.03–0.7% by weight and a total amount of the three desired halogens of up to 0.6% by weight produce a glass which is essentially transparent while greater amounts up to 1.5% by weight produce increasingly translucent glasses due to the increase in number and size of the precipitated silver halide crystallites. Thus, the glasses resulting from melting a suitable batch for such compositions, pressing the molten glass to form patties thereof, and annealing for about one hour at a temperature of 450–550° C., vary in optical transmittance as is shown by the description of the appearance of the glass bodies so produced.

These glasses exhibit the desired phototropic characteristic either at the end of the above-described forming process or after subsequent exposure to a temperature between the strain and softening point of the glass. Example 30 must be heat treated after forming by exposing it to a temperature between the strain point and its softening point for a time sufficient to allow formation of silver chloride particles within the glass, this preferably being accomplished by heating the body as fast as possible without shattering to a temperature of 575° C. and holding it at such temperature for 4 hours and then cooling it.

The reversibility of this desirable phenomenon in the glasses of this invention is demonstrated by measuring the transmittance of the glass of Example 10, a preferred embodiment of this invention, before and after exposure for 2 minutes to the above-described ultra-violet radiation and again 10 minutes after the termination of such exposure. FIG. 1, in which transmittance is plotted against time, sets forth the results obtained during 10 such cycles of exposure and fading.

FIG. 2 is a perspective view illustrating an embodiment of this invention comprising a window 10, consisting of a frame 12, and a sheet of glass 14 containing dispersed therein radiation sensitive crystals of at least one of the operative silver halides, the frame being affixed to the wall of a building 16, only partially shown, by means not shown to provide means for enclosing an opening in said wall.

What is claimed is:
1. A phototropic article comprising a silicate glass body having in at least a portion thereof microcrystals of at least one silver halide selected from the group consisting of silver chloride, silver bromide, and silver iodide, the concentration of said crystals in said portion being at least 0.005% by volume.

2. A phototropic article comprising a body of a silicate glass having in at least a portion thereof microcrystals of at least one silver halide selected from the group consisting of silver chloride, silver bromide, silver iodide, and mixtures thereof, said portion of the glass containing by weight on the basis of chemical analysis, at least one halogen in the indicated minimum effective proportion of 0.2% chlorine, 0.1% bromine, and 0.08% iodine, and a minimum of silver in the indicated proportion of 0.2% in a glass wherein the effective halogen consists of chlorine, 0.05% in a glass containing at least 0.1% bromine but containing less than 0.08% iodine, and 0.03% in a glass which contains at least 0.08% iodine.

3. A transparent phototropic article according to claim 1 in which the concentration of said crystals is not more than 0.1% by volume, said crystals are not more than 0.1 micron in diameter, and the remainder of said portion of the glass body is substantially amorphous.

4. A transparent phototropic article according to claim 2 in which said portion of the glass contains by weight on the basis of chemical analysis up to 0.7% silver and a total of up to 0.6% of the halogens, chlorine, bromine and iodine.

5. A phototropic article according to claim 1 in which said crystals of silver halide contain at least a trace of metallic silver.

6. A phototropic article according to claim 2 in which said crystals contain at least a trace of metallic silver.

7. A transparent phototropic article according to claim 3 in which said crystals of silver halide contain at least a trace of metallic silver.

8. A transparent phototropic article according to claim 4 in which said crystals of silver halide contain at least a trace of metallic silver.

9. A glass composition which is potentially phototropic comprising in weight percent as chemically analyzed 40–76% $SiO_2$, 4–26% $Al_2O_3$, 4–26% $B_2O_3$, at least one alkali metal oxide in the indicated proportion selected from the group consisting of 2–8% $Li_2O$, 4–15% $Na_2O$, 6–20% $K_2O$, 8–25% $Rb_2O$, and 10–30% $Cs_2O$, at least one halogen in the indicated minimum effective proportion of 0.2% chlorine, 0.1% bromine, and 0.08% iodine, and a minimum of silver in the indicated proportion of 0.2% in a glass wherein the effective halogen consists of chlorine, 0.05% in a glass containing at least 0.1% bromine but containing less than 0.08% iodine, and 0.03% in a glass which contains at least 0.08% iodine, the total of the recited base glass constituents, silver, and halogens being at least 85% of the total glass composition.

10. A glass composition according to claim 9 containing 0.01–0.1% of copper oxide.

11. A silicate glass capable of conversion to the phototropic condition comprising on a weight percent basis as determined by chemical analysis at least one halogen in the indicated minimum effective proportion of 0.2% chlorine, 0.1% bromine, and 0.08% iodine, and a minimum amount of silver in the indicated proportion of 0.2% in a glass wherein the effective halogen consists of chlorine, 0.05% in a glass containing at least 0.1% bromine but containing less than 0.08% iodine, and 0.03% in a glass which contains at least 0.08% iodine.

12. A silicate glass according to claim 11 containing a low-temperature reducing agent in the indicated proportion selected from the group consisting of 0.002–0.10% tin oxide, 0.002–0.02% iron oxide, 0.01–0.1% copper oxide, 0.04–0.4% arsenic oxide, and 0.1–1.0% antimony oxide.

13. A silicate glass according to claim 11 in which the silver is present in an amount at least equal in weight percent to the total amount of the three halogens chlorine, bromine, and iodine.

14. A silicate glass capable of conversion to the transparent, phototropic condition comprising on the weight percent basis as determined by chemical analysis at least one halogen in the indicated minimum effective proportion of 0.2% chlorine, 0.1% bromine, and 0.08% iodine, the total of said halogens being up to 0.6%, and silver in an amount between the indicated minimum proportion of 0.2% in a glass wherein the effective halogen consists of chlorine, 0.05% in a glass containing at least 0.1% bromine, but containing less than 0.08% iodine, and 0.03% in a glass which contains at least 0.08% iodine, and up to 0.7% silver.

15. The method of producing a phototropic glass body which comprises melting a batch for a silicate glass, said batch containing the constituents of a silver halide selected from the group consisting of silver chloride, silver bromide, silver iodide and mixtures thereof to produce a glass containing by weight on an analyzed basis at least one halogen in the indicated minimum effective proportion of 0.2% chlorine, 0.1% bromine, and 0.08% iodine, and a minimum of silver in the indicated proportion of 0.2% in a glass wherein the effective halogen consists of chlorine, 0.05% in a glass containing at least 0.1% bromine but containing less than 0.08% iodine, and 0.03% in a glass which contains at least 0.08% iodine, melting the batch, cooling and forming the molten batch to form a glass article, and thereafter heat treating said glass article at a temperature between the strain point and softening point of said glass for a time sufficient to produce a second phase within said glass, said second phase comprising at least 0.005% by volume of said glass article and consisting of at least one of said silver halides, and thereafter cooling the article to cause said second phase to crystallize.

16. The method of manufacturing a glass body having at least a surface layer that is phototropic which comprises contacting the surface of an alkali metal-containing silicate glass including at least one halogen in the indicated minimum effective proportion by weight selected from the group consisting of 0.2% chlorine, 0.1% bromine, and 0.08% iodine with at least one silver-containing material selected from the group consisting of silver and silver compounds, heating said glass and said silver-containing material in contact therewith for a sufficient length of time to effect an exchange of silver ions for alkali-metal ions in at least the surface of the glass and cause the silver ions to react with the halogen present to form silver halide crystals, said exchange producing a minimum concentration of silver by weight of 0.2% in a glass wherein the effective halogen is chlorine, 0.05% in a glass containing at least 0.1% bromine but containing less than 0.08% iodine, and 0.03% in a glass containing at least 0.08% iodine.

References Cited by the Examiner

UNITED STATES PATENTS

| | | | |
|---|---|---|---|
| 2,049,765 | 8/36 | Fischer | 252—301.4 |
| 2,219,895 | 10/40 | Hanlein | 252—301.4 |
| 2,662,035 | 12/53 | Levi | 106—34 |
| 2,662,036 | 12/53 | Levi | 106—34 |
| 2,971,853 | 2/61 | Stookey | 106—52 |
| 3,020,238 | 2/62 | Munakata et al. | 250—83 |

OTHER REFERENCES

Banerjee: J. American Society, September 1953, "X-ray Study of Glass Fibers," pages 294–298.

Weyl: "Coloured Glasses," 1959, Dawson's of Pall Mall, London, pages 500–521.

Chemical Week, September 29, 1962, "Technology Newsletter," "Glass That Automatically Tints on Exposure to Light," page 85.

TOBIAS E. LEVOW, *Primary Examiner*.